(12) United States Patent
Lee

(10) Patent No.: US 7,099,148 B2
(45) Date of Patent: Aug. 29, 2006

(54) DISPLAY APPARATUS

(75) Inventor: Kyung-kyun Lee, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 261 days.

(21) Appl. No.: 10/775,158

(22) Filed: Feb. 11, 2004

(65) Prior Publication Data
US 2004/0165344 A1 Aug. 26, 2004

(30) Foreign Application Priority Data
Feb. 21, 2003 (KR) ............... 10-2003-0011084

(51) Int. Cl.
*G06F 1/16* (2006.01)
(52) U.S. Cl. ................... 361/681; 361/683
(58) Field of Classification Search .......... 361/679, 361/681, 683, 685
See application file for complete search history.

(56) References Cited

U.S. PATENT DOCUMENTS 6,400,560 B1 6/2002 Chian
6,437,975 B1 8/2002 Huang
6,530,784 B1 * 3/2003 Yim et al. ............... 439/31

FOREIGN PATENT DOCUMENTS

| JP | 2001-282115 | 10/2001 |
| KR | 95-9317 | 4/1995 |
| KR | 2000-19611 | 11/2000 |
| KR | 20-290293 | 9/2002 |

* cited by examiner

*Primary Examiner*—Yean-Hsi Chang
(74) *Attorney, Agent, or Firm*—Staas & Halsey LLP

(57) ABSTRACT

A display apparatus comprises a monitor on which pictures are displayed, brackets installed on the monitor and having slits on opposite sides of each bracket, spring brackets combined to the brackets and having locking members inserting into the brackets through the slits and stands selectively inserted into the brackets and locked in the locking members of the spring brackets. The present invention provides a display apparatus that can maintain a consistent connection between the monitor and the stands from frequent locking and unlocking and keeps the control point accurate.

10 Claims, 5 Drawing Sheets

DISPLAY APPARATUS

CROSS-REFERENCE TO RELATED APPLICATIONS

This application claims the benefit of Korean Patent Application No. 2003-11084, filed on Feb. 21, 2003, in the Korean Intellectual Property Office, the disclosure of which is incorporated herein by reference.

BACKGROUND OF THE INVENTION

1. Field of the Invention

The present invention relates to a display apparatus, and more particularly, to a display apparatus that can selectively attach and detach a monitor and a stand using a bracket connection structure.

2. Description of the Related Art

A display apparatus generally comprises various devices displaying data in the form of letters and diagrams on a Braun tube. An LCD (Liquid Crystal Display), a flat panel display device, tends to extend its range of utility from a computer monitor to a TV.

As shown in FIG. 1, a conventional display apparatus includes a monitor 2 on which pictures are displayed; a spring bracket 4 having a lock 5; and a stand 6 attachable to and detachable from the lock 5 and supporting the monitor 2.

Since the conventional displaying apparatus comprises only one spring bracket which supports four directional (up/down/left/right) movements of the stand 6, the stand 6 may not maintain an accurate control point if used for a long period of time. It also requires frequent replacement of the bracket because the elasticity of the spring bracket may be reduced due to frequent locking or unlocking between the monitor 2 and the stand 6.

SUMMARY OF THE INVENTION

Accordingly, it is an aspect of the present invention to provide an improved connection of a spring bracket and a stand and, to make the bracket maintain an accurate control point of the stand regardless of the amount of time used.

Additional aspects and advantages of the invention will be set forth in part in the description which follows and, in part, will be obvious from the description, or may be learned by practice of the invention.

The foregoing and/or other aspects of the present invention are achieved by providing a display apparatus comprising a monitor on which pictures are displayed, brackets installed on the monitor and having slits on opposite sides of each bracket; spring brackets combined to the brackets and having locking members inserted into the brackets through the slits, and stand selectively inserted into the brackets and locked into the locking members of the spring brackets.

According to an aspect of the invention, the locking members of each of the spring brackets elastically combine with each stand.

According to an aspect of the invention, each stand comprises a stand base, and a stand shaft rotatably installed on the stand base and having locking grooves engaged with the locking members of each of the spring brackets.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE PREFERRED EMBODIMENTS

Figure 1:
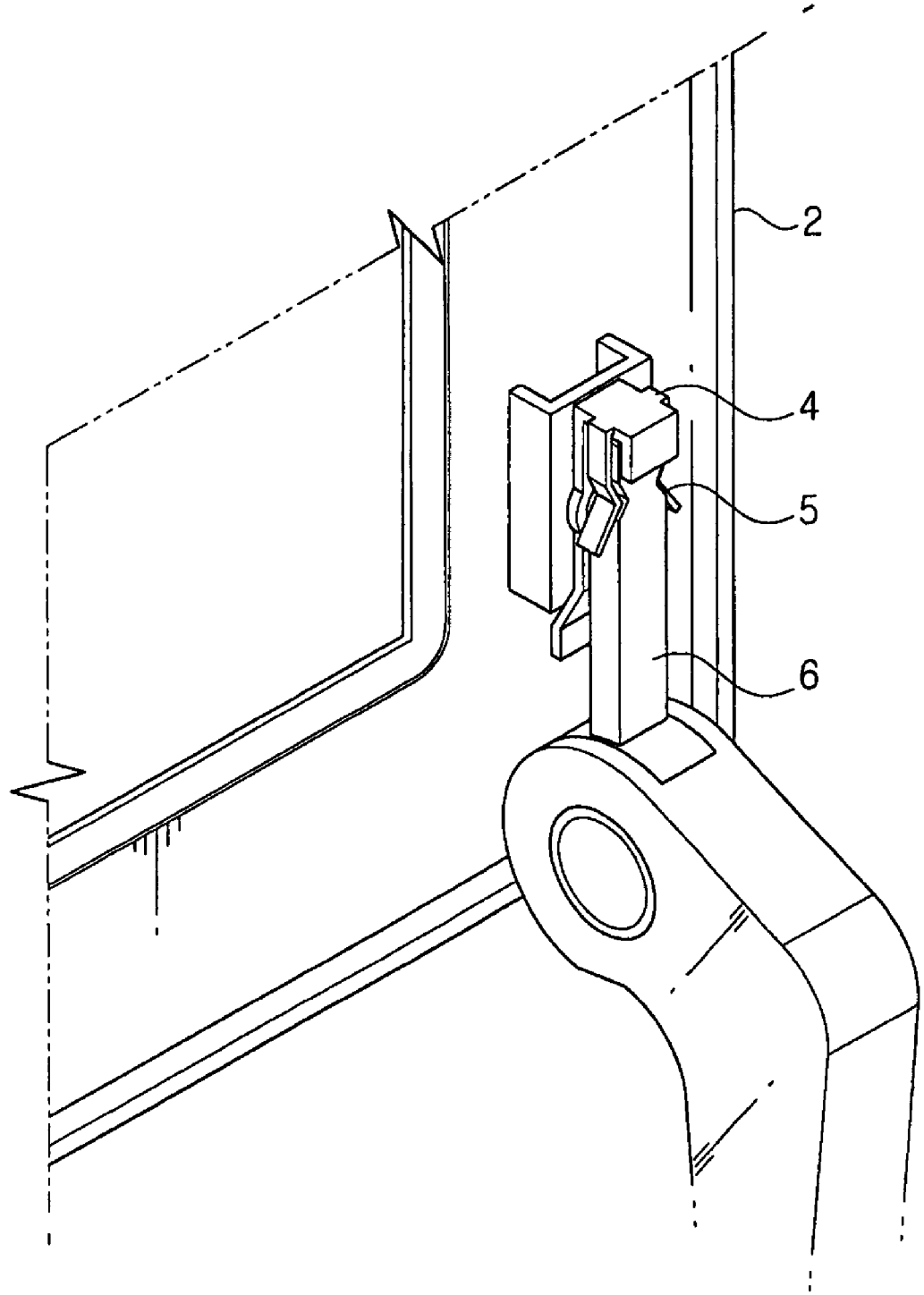
FIG. 1 is a sectional perspective view of a stand combination structure of a conventional display apparatus.

Reference will now be made in detail to the embodiments of the present invention, examples of which are illustrated in the accompanying drawings, wherein like reference numerals refer to like elements throughout. The embodiments are described below in order to explain the present invention by referring to the figures.

Figure 2:
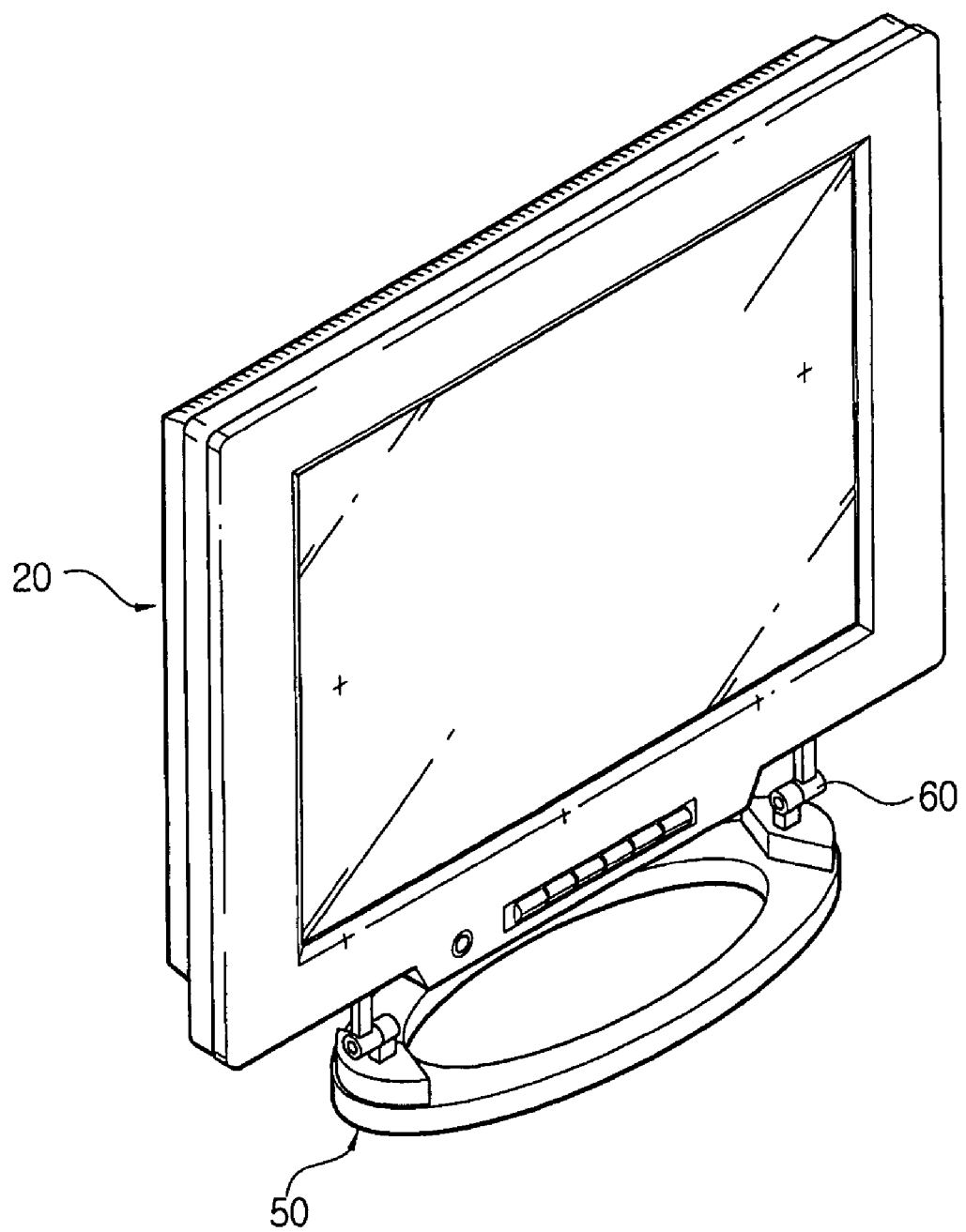
FIG. 2 is a perspective view of a display apparatus according to an embodiment of the present invention.
Figure 3:
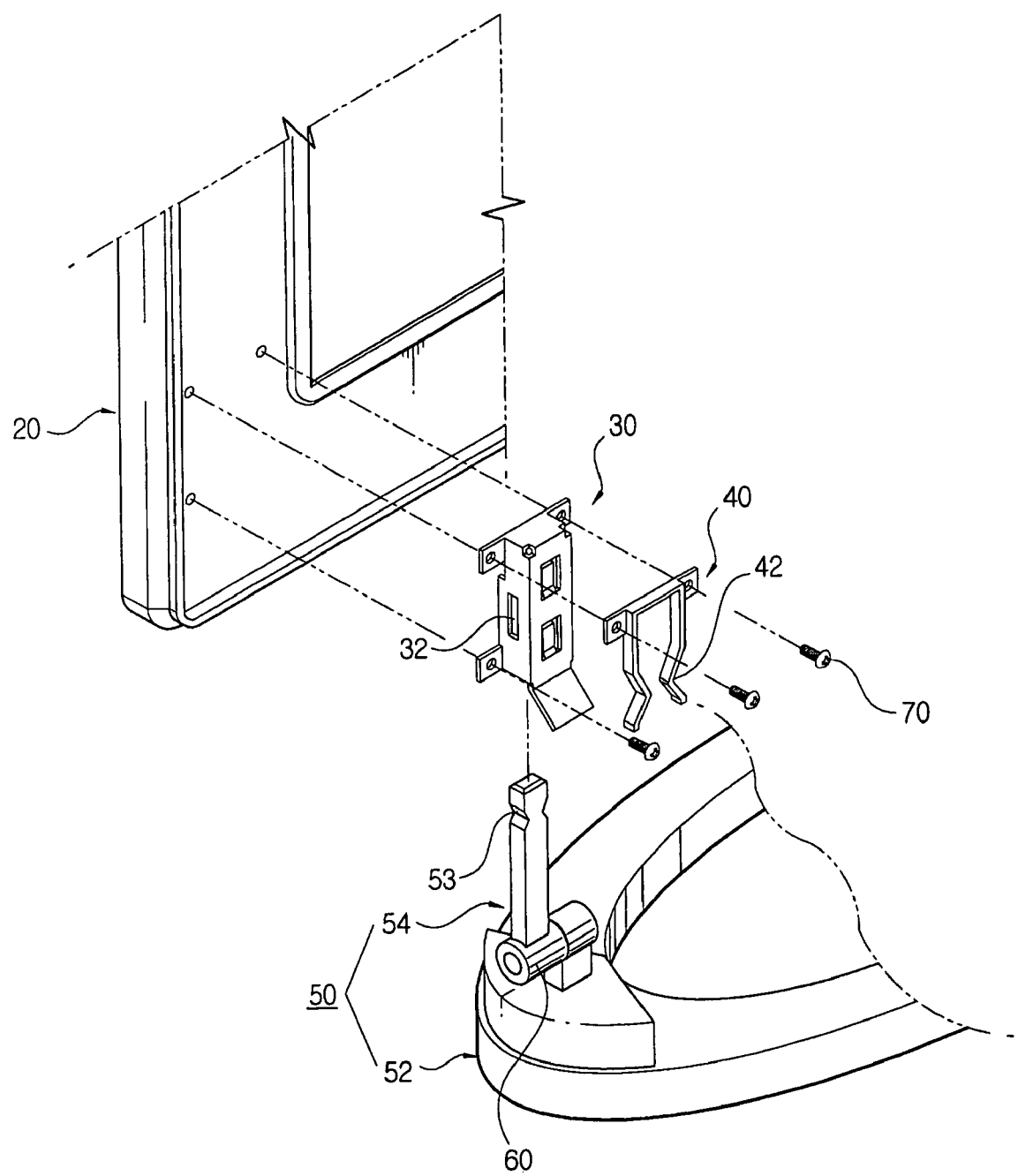
FIG. 3 an exploded perspective view of a stand combination structure according to the present invention.
Figure 4A:
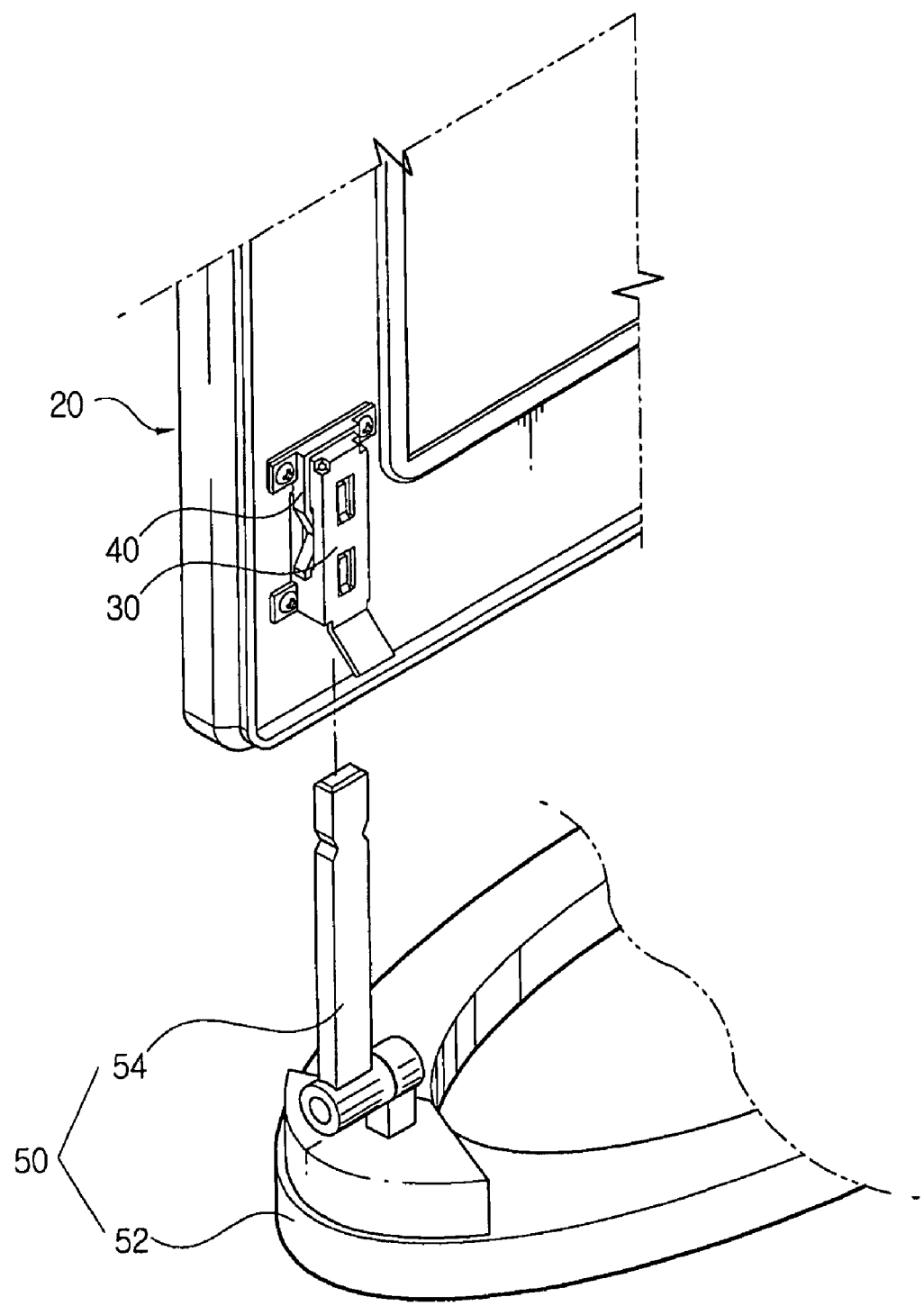
FIGS. 4A and 4B are perspective views of a stand combination structure according to the present invention.
Figure 4B:
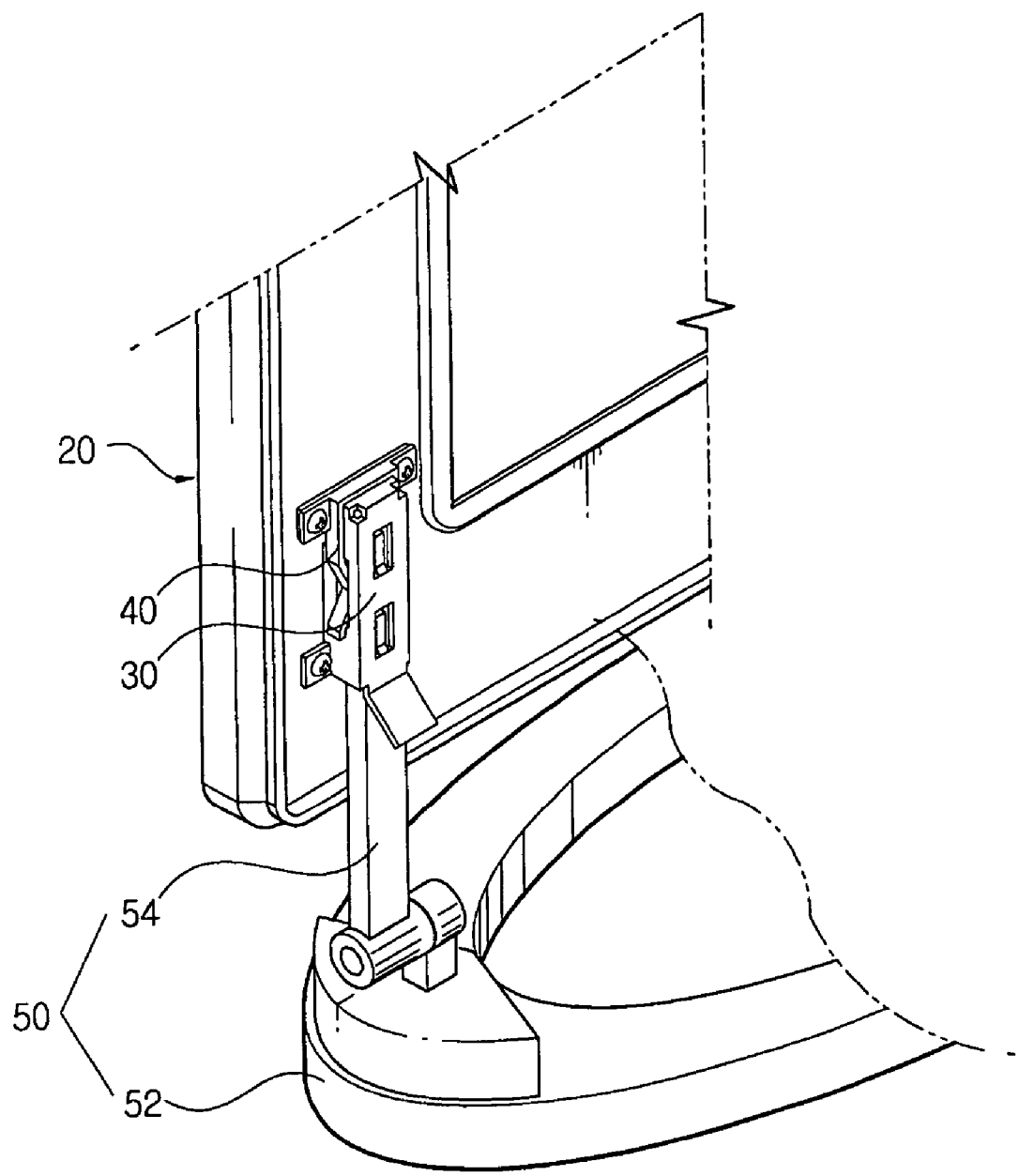

FIG. 2 is a perspective view of a display apparatus according to an embodiment of the present invention, and FIG. 3 is an exploded perspective view illustrating a connection structure of a stand of FIG. 2. FIGS. 4A and 4B illustrate a combination of the stand.

In FIGS. 2 and 3, the display apparatus comprises a monitor 20 on which pictures are displayed, brackets 30 installed on the monitor 20 by screws 70 and having slits 32 on both sides of each bracket, spring brackets 40 connected to the brackets 30 and formed with locking members 42 inserted into the brackets 30 through the slots 32, and stands 50 selectively inserted into the brackets 30 and locked with the locking members 42.

Each bracket 30 is box-shaped and supports the stand 50 to maintain a control point without moving in any direction. A side of each of the brackets 30 which faces the monitor 20 is opened and a side at a bottom of each of the brackets 30 which faces the stand 50 is opened. The shape and the size of the brackets 40 depend on the stands 50.

The spring brackets 40 prevent the stands 50 from moving downward by locking the stands 50 in a state wherein the spring brackets 40 are pressing sidewalls of the brackets 30. The spring brackets 40 may have various installation structures as long as the locking members 42 of the spring brackets 40 insert into the slits 32 on the sides of the brackets 30 in order to support the stands 50. The spring brackets 40 are made of an elastic material for easy locking and unlocking of the locking members 42 to the stands 50.

Each of the stands 50 comprise a stand base 52 and a stand shaft 54 rotatably installed on the stand base 52 via a hinge 60. The stand shaft 54 comprises locking grooves 53, wherein the locking members 42 of the spring brackets 40 are locked. The locking grooves 53 are detachably engaged with the locking members 42 of the spring bracket 40.

An assembling process of the monitor 20 and the stands 50 described above is briefly described as followed.

When the monitor 20 is combined with the stands 50, the stand shaft 54 each of the stands 50 is inserted into the brackets 30 so that the locking members 42 of the spring brackets 40 are locked in the locking grooves 53 of each of the stand shaft 54. Thus, unnecessary movement of the monitor 20 may be prevented, and the connection between the monitor 20 and the stands 50 can be firmly maintained.

When disassembling, the monitor 20 may be easily separated from the stands 50 by pulling the stands 50 off of the monitor 20. Then the locking members 42 of the spring brackets 40 slide off the locking grooves 53.

As described above, the present invention can provide the display apparatus that can maintain a consistent connection between the monitor 20 and the stands 50 from frequent locking and unlocking and keep the control point accurate.

The present invention provides high expectation of improvement of quality and cost-effectiveness.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A display apparatus comprising:
    a monitor on which pictures are displayed;
    brackets installed on the monitor and having slits on opposite sides of each bracket;
    spring brackets combined to the brackets and having locking members inserting from outside into the brackets through the slits; and
    stands selectively inserted into the brackets and locked in the locking members of the spring brackets.

2. The display apparatus of claim 1, wherein the locking members of the spring brackets elastically combine with the stands.

3. The display apparatus of claim 2, wherein each of the stands comprises:
    a stand base; and
    a stand shaft rotatably installed on the stand base and having locking grooves engaged with the locking members of each of the spring brackets.

4. The display apparatus of claim 1, wherein the brackets are box-shaped and support the stands to maintain a control point of the stands.

5. The display apparatus of claim 1, wherein a side of each of the brackets which faces the monitor is opened and a bottom of each of the brackets which faces the stands is opened.

6. The method of assembling a display apparatus, the method comprising:
    combining a monitor with stands;
    attaching spring brackets and brackets to the monitor "by attaching the spring brackets from outside into the brackets through slits on both sides of the brackets";
    inserting a stand shaft of each of the stands into each bracket installed on the monitor; and
    locking each of the spring brackets into locking grooves of the stand shafts.

7. A bracket connection structure for connecting a first apparatus to a second apparatus, the bracket connection structure comprising:
    brackets having slits on both sides of each bracket and installed on the first apparatus;
    spring brackets connected to the brackets and formed with locking members wherein the locking members are inserted from outside into the brackets through the slits;
    shafts are installed on the second apparatus and comprising locking grooves, wherein the shafts are inserted into the brackets and the locking grooves are locked by the locking members of the spring brackets.

8. The bracket connection structure of claim 7, wherein the first apparatus is a display and the second apparatus is a stand.

9. A display apparatus comprising:
    a monitor on which pictures are displayed;
    brackets installed on the monitor and having recesses on opposites sides thereof;
    spring brackets which fit around the brackets and are supported by the brackets and having locking members inserted into the brackets through the recesses; and
    stands inserted into the brackets and locked by the locking members of the spring brackets to limit the movement of the stands.

10. A display apparatus comprising:
    a monitor on which pictures are displayed;
    spring brackets installed on the monitor and having locking members;
    brackets inserted into the spring brackets and comprising recesses wherein the locking members of the spring brackets are inserted; and
    stands inserted into the brackets and locked by the locking members of the spring brackets to limit movement of the stands.

* * * * *

UNITED STATES PATENT AND TRADEMARK OFFICE
CERTIFICATE OF CORRECTION

| | | |
|---|---|---|
| PATENT NO. | : 7,099,148 B2 | Page 1 of 1 |
| APPLICATION NO. | : 10/775158 | |
| DATED | : August 29, 2006 | |
| INVENTOR(S) | : Kyung-kyun Lee | |

It is certified that error appears in the above-identified patent and that said Letters Patent is hereby corrected as shown below:

Column 3, Line 42, change ""by" to --by--.

Column 3, Line 44, change "brackets";" to --brackets;--.

Column 4, Line 24, change "opposites" to --opposite--.

Signed and Sealed this

Twenty-seventh Day of February, 2007

JON W. DUDAS
*Director of the United States Patent and Trademark Office*